(12) United States Patent
Welter et al.

(10) Patent No.: US 11,208,160 B1
(45) Date of Patent: Dec. 28, 2021

(54) ADJUSTABLE AIRFOIL SYSTEM FOR A VEHICLE

(71) Applicant: Aisin Technical Center of America, Inc., Northville, MI (US)

(72) Inventors: Aaron Welter, Livonia, MI (US); Eric Archambeau, South Lyon, MI (US); Andres Garza, Livonia, MI (US)

(73) Assignee: Aisin Technical Center of America, Inc., Northville, MI (US)

( * ) Notice: Subject to any disclaimer, the term of this patent is extended or adjusted under 35 U.S.C. 154(b) by 42 days.

(21) Appl. No.: 16/911,730

(22) Filed: Jun. 25, 2020

(51) Int. Cl.
*B62D 35/00* (2006.01)
*B62D 37/02* (2006.01)

(52) U.S. Cl.
CPC ........... *B62D 35/007* (2013.01); *B62D 37/02* (2013.01)

(58) Field of Classification Search
CPC .............................. B62D 35/007; B62D 37/02
See application file for complete search history.

(56) References Cited

U.S. PATENT DOCUMENTS

| | | | |
|---|---|---|---|
| 5,454,619 A * | 10/1995 | Haraway, Jr. | ........ B62D 35/007 296/180.1 |
| 6,193,302 B1 | 2/2001 | Won et al. | |
| 7,770,962 B1 * | 8/2010 | Maxwell | .............. B62D 35/007 296/180.5 |
| 9,403,564 B1 | 8/2016 | Al-Huwaider | |
| 10,035,548 B2 | 7/2018 | Barber | |
| 10,220,892 B1 | 3/2019 | Fahland et al. | |
| 11,124,250 B1 * | 9/2021 | Lindberg | ............... B62D 37/02 |
| 2002/0167196 A1 | 11/2002 | Huang | |
| 2007/0228774 A1 * | 10/2007 | Vlahovic | ............... B62D 37/02 296/180.5 |
| 2013/0221701 A1 * | 8/2013 | De Luca | ................ B62D 37/02 296/180.5 |
| 2013/0261852 A1 * | 10/2013 | Recksiek | ............... B64C 13/30 701/3 |
| 2017/0158258 A1 * | 6/2017 | Fahland | ................ B62D 37/02 |

(Continued)

FOREIGN PATENT DOCUMENTS

| CA | 2863583 A1 | 8/2013 |
|---|---|---|
| CN | 204368123 U | 6/2015 |

(Continued)

*Primary Examiner* — Lori L Lyjak
(74) *Attorney, Agent, or Firm* — Christopher G. Darrow; Darrow Mustafa PC

(57) ABSTRACT

An adjustable airfoil system for a vehicle includes a first airfoil shaft, a first airfoil having a first end mounted on the first airfoil shaft, and a first airfoil support structured for mounting to a portion of a vehicle and for rotatably supporting a portion of the first airfoil shaft at a location spaced apart from a first end of the first airfoil shaft. The system also includes a second airfoil shaft, a second airfoil having a first end mounted on the second airfoil shaft, and a second airfoil support structured for mounting to a portion of a vehicle and for rotatably supporting a portion of the second airfoil shaft spaced apart from a first end of the second airfoil shaft. A shaft end support is rigidly coupled to the first airfoil support and the second airfoil support. The shaft end support is structured to rotatably support the first end of the first airfoil shaft and the first end of the second airfoil shaft when the shaft end support is rigidly coupled to the first airfoil support and the second airfoil support.

16 Claims, 6 Drawing Sheets

(56) References Cited

U.S. PATENT DOCUMENTS

| | | | |
|---|---|---|---|
| 2018/0001944 A1* | 1/2018 | Causley | B62D 37/02 |
| 2018/0057141 A1 | 3/2018 | Shormann | |
| 2019/0248430 A1* | 8/2019 | Kim | B62D 35/007 |
| 2019/0283815 A1* | 9/2019 | Weber | B62D 35/007 |
| 2021/0070380 A1* | 3/2021 | Zhang | B62D 37/02 |
| 2021/0269103 A1* | 9/2021 | Lindberg | B62D 35/00 |

FOREIGN PATENT DOCUMENTS

| | | |
|---|---|---|
| DE | 102011103787 A1 | 12/2012 |
| EP | 1031497 A2 | 8/2000 |
| EP | 1216914 B1 | 6/2002 |
| EP | 1693285 B1 | 8/2006 |
| JP | WO2008041757 A1 | 4/2010 |

\* cited by examiner

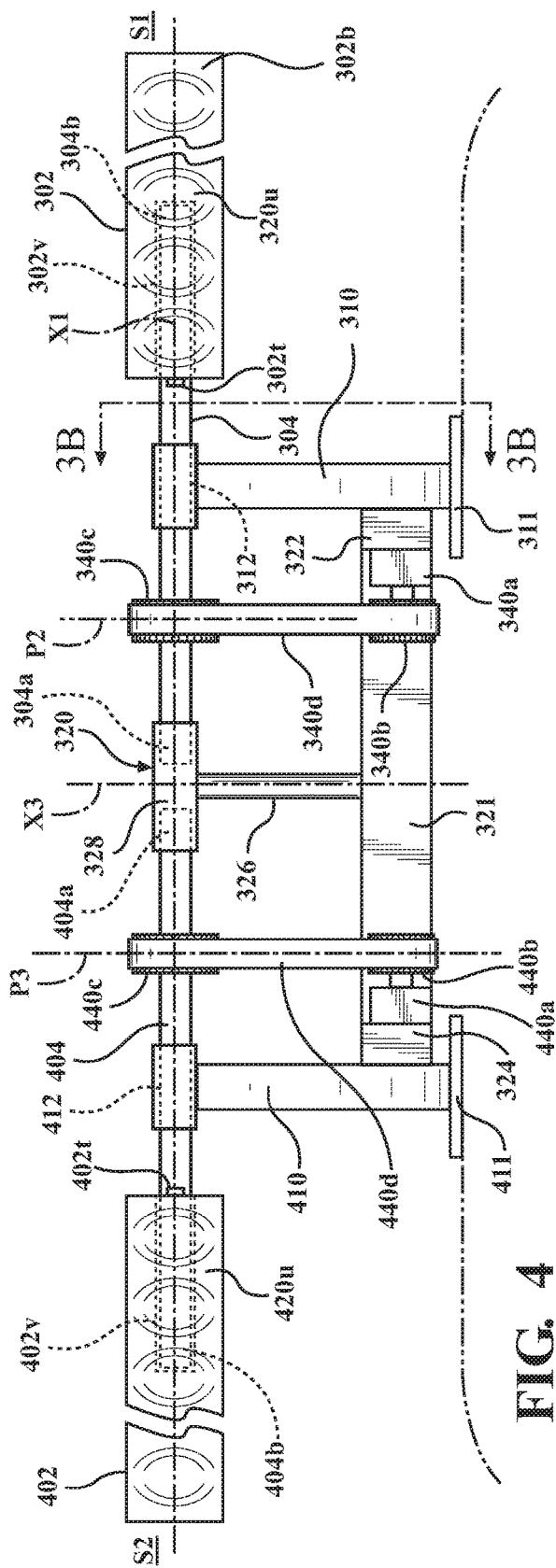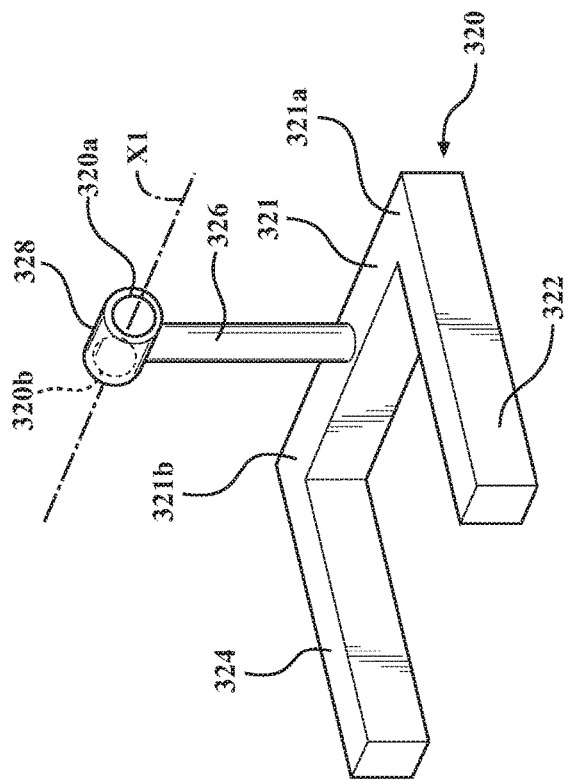
FIG. 4
FIG. 5

ADJUSTABLE AIRFOIL SYSTEM FOR A VEHICLE

TECHNICAL FIELD

The subject matter described herein relates to motor vehicle performance enhancement systems, and particularly to a dual airfoil system for vehicles which is dynamically adjustable to selectively increase downforce on the vehicle responsive to maneuvering conditions.

BACKGROUND

Airfoils may be incorporated into vehicles to enable a degree of control over the aerodynamic profile of the vehicle and the aerodynamic forces acting on the vehicle. Mountings should provide enough rigidity of support to maintain the airfoil in a desired angle with respect an airflow impinging on a leading edge of the airfoil. However, some airfoil mountings require an undesirable amount of bulk or complexity in order to provide the necessary rigidity of support. Also, it may be difficult to repair and replace damaged airfoils.

SUMMARY

In one aspect of the embodiments described herein, an adjustable airfoil system for a vehicle is provided. The system includes a first airfoil shaft, a first airfoil having a first end mounted on the first airfoil shaft, and a first airfoil support structured for mounting to a portion of a vehicle and for rotatably supporting a portion of the first airfoil shaft at a location spaced apart from a first end of the first airfoil shaft. The system also includes a second airfoil shaft, a second airfoil having a first end mounted on the second airfoil shaft, and a second airfoil support structured for mounting to a portion of a vehicle and for rotatably supporting a portion of the second airfoil shaft spaced apart from a first end of the second airfoil shaft. A shaft end support is rigidly coupled to the first airfoil support and the second airfoil support. The shaft end support is structured to rotatably support the first end of the first airfoil shaft and the first end of the second airfoil shaft when the shaft end support is rigidly coupled to the first airfoil support and the second airfoil support.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIG. 4 is a schematic front view of the adjustable airfoil system shown in FIGS. 2A-3B.

FIG. 5 is a schematic perspective view of a shaft end support in accordance with an embodiment described herein.

DETAILED DESCRIPTION

Embodiments described herein relate to an adjustable airfoil system for a vehicle is provided. The system includes a first airfoil shaft, a first airfoil having a first end mounted on the first airfoil shaft, and a first airfoil support structured for mounting to a portion of a vehicle and for rotatably supporting a portion of the first airfoil shaft at a location spaced apart from a first end of the first airfoil shaft. The system also includes a second airfoil shaft, a second airfoil having a first end mounted on the second airfoil shaft, and a second airfoil support structured for mounting to a portion of a vehicle and for rotatably supporting a portion of the second airfoil shaft spaced apart from a first end of the second airfoil shaft. A shaft end support is rigidly coupled to the first airfoil support and the second airfoil support. The shaft end support is structured to rotatably support the first end of the first airfoil shaft and the first end of the second airfoil shaft when the shaft end support is rigidly coupled to the first airfoil support and the second airfoil support. Associated airfoil rotation mechanisms are coupled to the first and second airfoil shafts and to portions of the shaft end supports for controlling rotation of each airfoil individually and independently of the other airfoil responsive to commands generated by an airfoil system control module. The airfoils may be autonomously or manually controlled to vary the downforce acting on left and right sides of the vehicle.

Figure 1:
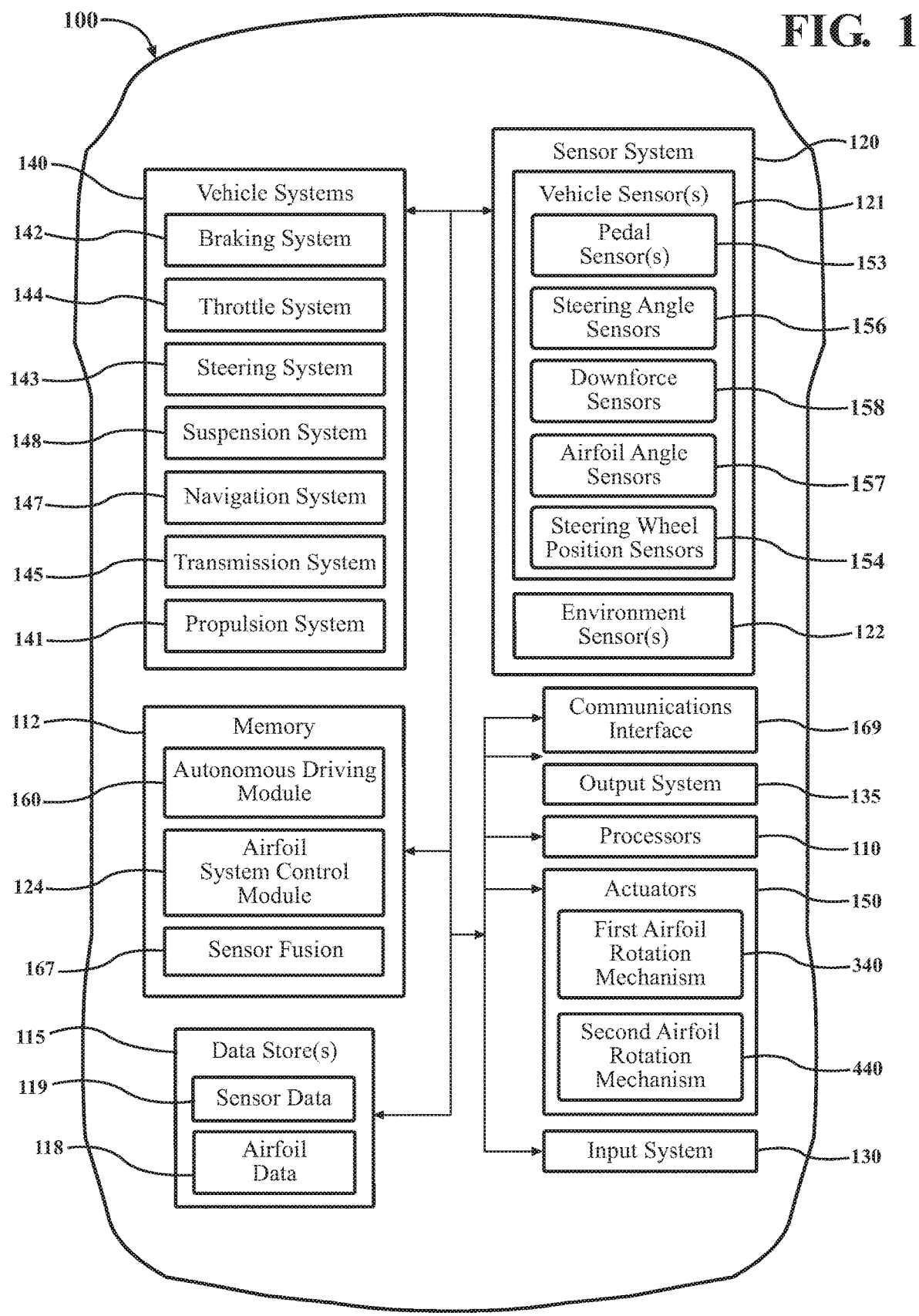
FIG. 1 is a block schematic diagram of a vehicle incorporating an adjustable airfoil system in accordance with embodiments described herein.
Figure 3A:
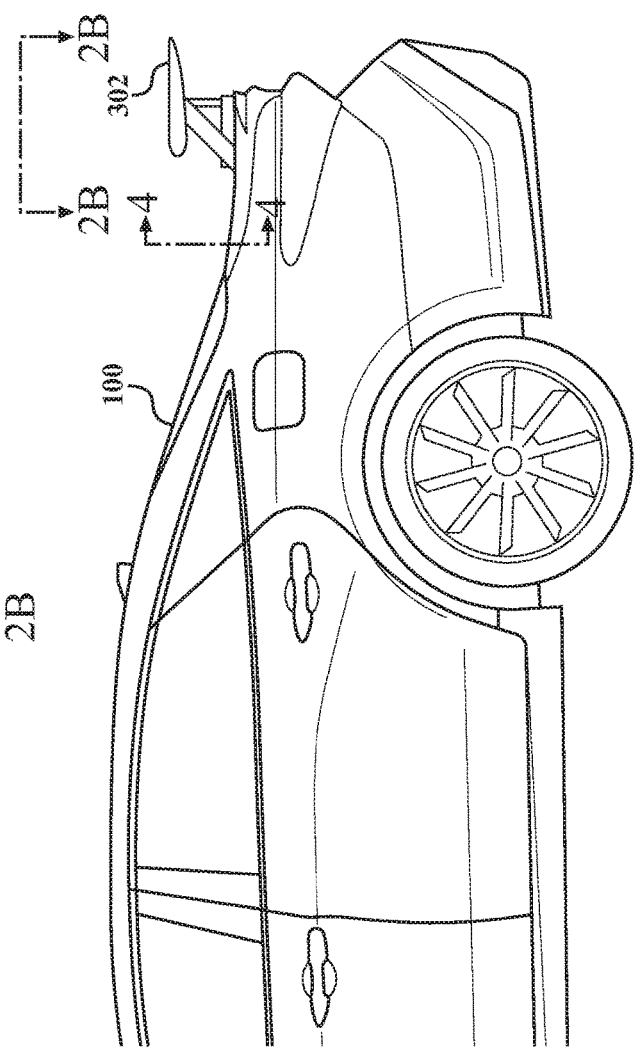
FIG. 3A is a schematic side view of the vehicle and adjustable airfoil system shown in FIGS. 2A-2B.

Referring to FIG. 1, an example of a vehicle 100 is illustrated. As used herein, a "vehicle" is any form of motorized transport. In one or more implementations, the vehicle 100 is a passenger vehicle. While arrangements will be described herein with respect to passenger vehicles, it will be understood that embodiments are not limited to passenger vehicles. In some implementations, the vehicle 100 may be any form of motorized transport that benefits from the functionality discussed herein.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100.

Some of the possible elements of the vehicle 100 are shown in FIG. 1 and will be described with reference thereto. Additionally, it will be appreciated that for simplicity and clarity of illustration, where appropriate, reference numerals may have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

FIG. 1 shows a block schematic diagram of a vehicle incorporating an adjustable airfoil system in accordance with embodiments described herein. In some instances, the vehicle 100 may be configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that can operate in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one or more arrangements, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along the travel route.

The vehicle 100 can include one or more processors 110. In one or more arrangements, the processor(s) 110 can be a main processor(s) of the vehicle 100. For instance, the processor(s) 110 can be an electronic control unit (ECU). The vehicle 100 can include one or more data stores 115 for storing one or more types of data. The data store(s) 115 can include volatile and/or non-volatile memory. Examples of suitable data store(s) 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 115 can be a component of the processor(s) 110, or the data store(s) 115 can be operably connected to the processor(s) 110 for use thereby. The term "operably connected," as used throughout this description, can include direct or indirect connections, including connections without direct physical contact.

The one or more data store(s) 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more radar sensors of the sensor system 120.

The one or more data stores 115 can include airfoil data 118. Airfoil data 118 may include characteristics of each individual airfoil incorporated into the adjustable airfoil system as described herein. Non-exclusive examples of such characteristics include airfoil geometry information such as the total areas of upper and lower airfoil surfaces and information describing aerodynamic characteristics of the airfoil. For example, tubercles and/or other features may be incorporated into an airfoil leading edge to enhance airfoil aerodynamics at high speeds. Effects of such features on drag and other parameters in relation to vehicle speed and airfoil angle may be determined for each airfoil design and stored in airfoil data in the form of lookup tables, formulae, etc. This information may be used in conjunction with speed and airfoil angle sensor data to generate vehicle performance information to be viewed by a vehicle occupant or used to dynamically optimize or otherwise adjust the airfoil angle during vehicle use. This information may also be used to predict the results that changes in airfoil angle and vehicle speed will have on airfoil and vehicle performance parameters.

Figure 3B:
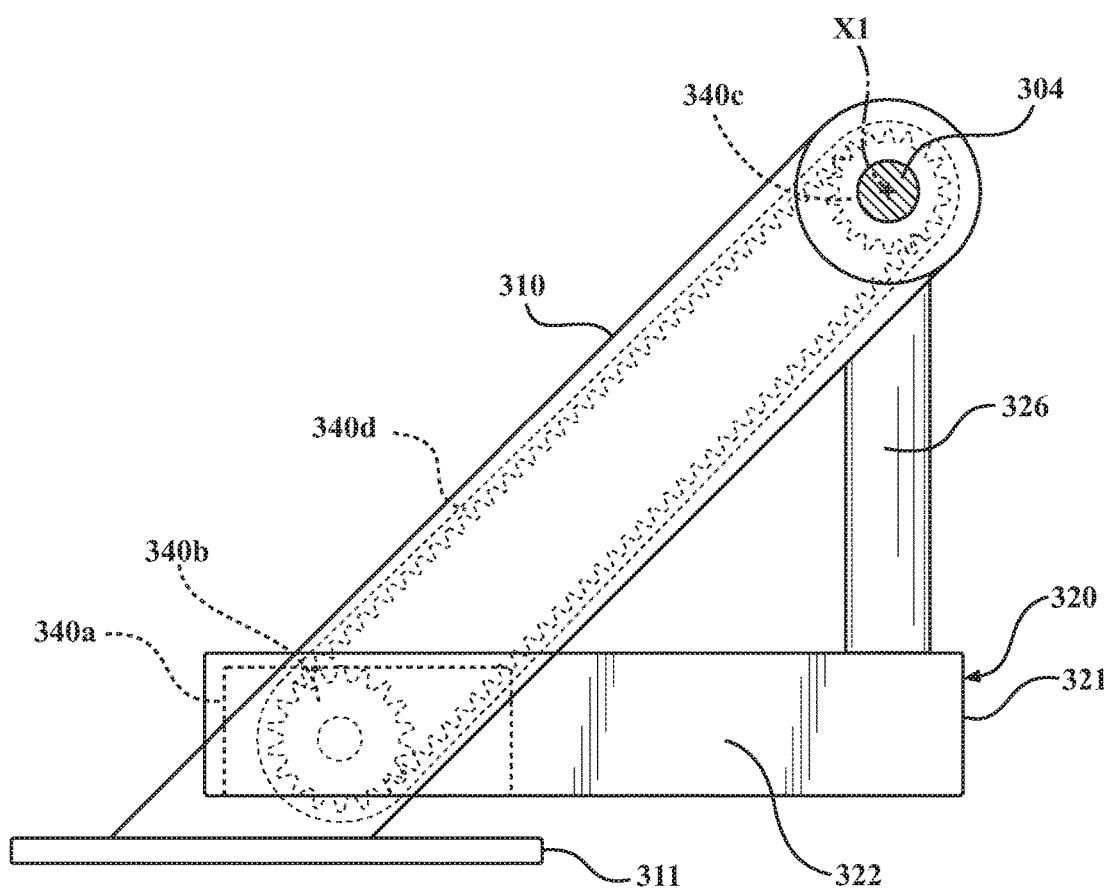
FIG. 3B is a magnified view of a portion of the adjustable airfoil system shown in FIG. 3A.
Figure 3C:
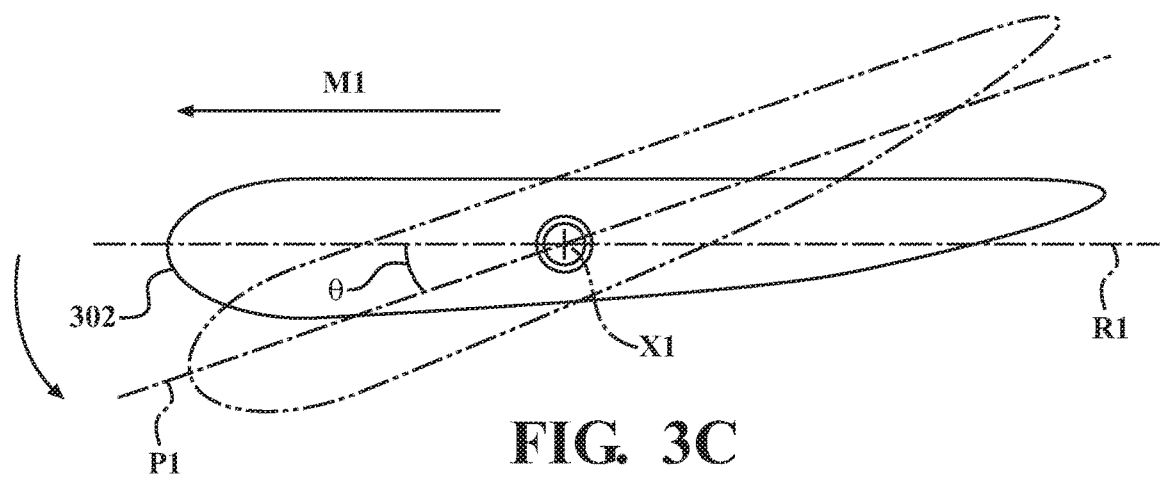
FIG. 3C is a schematic side view of the airfoil of FIG. 3A illustrating how an angle of the airfoil may be varied by operation of an airfoil rotation mechanism as described herein.

Referring to FIG. 3C, to determine the airfoil angle $\theta$, a plane P1 may be defined extending through an axis of rotation X1 of an airfoil 302 as mounted on the vehicle 100. The plane P1 may be defined to be horizontal when the airfoil is in a neutral or "level" orientation. The level orientation may be defined for each airfoil and airfoil attachment configuration. In addition, a horizontal reference plane R1 may be defined extending through the axis of rotation of the airfoil. The airfoil angle may be the angle $\theta$ between the planes P1 and R1 as the airfoil rotates. Direction M1 is a direction of motion of the airfoil 302 when the airfoil is mounted in a vehicle.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process. In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operably connected to the processor(s) 110, the data store(s) 115, and/or other element(s) of the vehicle 100 (including any of the elements shown in FIG. 1).

The sensor system 120 can include any suitable type of sensor. Various examples of different types of sensors will be described herein. However, it will be understood that the embodiments are not limited to the particular sensors described. The example sensors may be part of the one or more environment sensors 122 and/or the one or more vehicle sensors 121. However, it will be understood that the embodiments are not limited to the particular sensors described. The sensor system 120 may include any sensors suitable for and/or required to perform any of the data acquisition and/or vehicle control operations contemplated herein.

Sensors of sensor system 120 may be communicably coupled to the various systems and components of the vehicle 100. The sensors may be operably connected to the vehicle wireless communications interface 169 for transmission of information to a cloud or other storage facility or for vehicle-to-vehicle (V2V) or vehicle-to-everything (V2X) communications. The sensors may also be operably connected to other vehicle systems and components, such as data stores 115 and processor(s) 110, for storage and processing of vehicle and environment sensor data. Sensor system 120 may include sensors configured to detect the current state or status of vehicle systems and components and to generate indications (for example, using trouble codes) possible malfunctions of vehicle systems and components.

The sensor system 120 can include one or more vehicle sensors 121. The vehicle sensor(s) 121 can detect, determine, and/or sense information about the vehicle 100 itself and/or any occupants inside the vehicle. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100, such as the current geographical location of the vehicle. In one or more arrangements, the vehicle sensor(s) 121 can include a speedometer to determine a current speed and acceleration/deceleration of the vehicle 100. The vehicle sensor(s) 121 may include vehicle directional sensors (not shown) configured to determine a current heading of the vehicle or direction in which the vehicle is pointed. The vehicle sensor(s) 121 may include sensors configured to sense aspects of the vehicle mechanical and electrical components and/or systems, to aid in determining a mechanical condition of the vehicle and existing and/or potential problems with the vehicle.

The vehicle sensor(s) 121 can include steering wheel position sensors 154 configured to measure the angle of rotation of the steering wheel in relation to a reference steering angle associated with the direction in the vehicle front wheels are pointed. This can enable detection or determination of the direction of a turn and the severity of the vehicle turn, for example. Steering angle sensors 156 can measure the angle(s) of the vehicle front wheels with respect to a vertical plane extending through a fore-aft axis of the vehicle. The vehicle sensor(s) 121 can include one or more downforce sensors 158 configured to measure (or provide data usable for estimating) a contact force of the vehicle 100 with a road surface. For example, the downforce sensor(s) 158 can be configured to measure or estimate a force acting on an airfoil due to airflow impinging on the airfoil. The vehicle sensor(s) 121 can include airfoil angle sensors 157 configured to detect (or provide data usable for estimating) an angle of each individual airfoil with respect to a reference plane (for example, a horizontal plane R1 passing through an axis of rotation X1 of an airfoil as shown in FIG. 3B). This may enable correlation between the vehicle speed, airfoil angle, and downforce. Pedal sensors 153 can detect the positions and/or changes in positions of the accelerator and/or brake pedals. This can enable the airfoil angle to be adjusted autonomously in accordance with accelerator and/or brake pedal positions. Other vehicle sensors may also be included.

The sensor system 120 can include one or more environment sensors 122 configured to acquire data of at least a portion of the external environment of the vehicle 100 (e.g., nearby objects). The environment sensor(s) 122 may detect data or information about the external environment in which the vehicle is located or one or more portions thereof. For example, the one or more environment sensor(s) 122 can be configured to detect, quantify and/or sense obstacles in at least a portion of the external environment of the vehicle 100 and/or information/data about such obstacles. Such obstacles may be stationary objects and/or dynamic objects. The one or more environment sensor(s) 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, weather conditions, other vehicles, etc. As an example, in one or more arrangements, the environment sensor(s) 122 can include one or more radar sensors, one or more LIDAR sensors, one or more cameras, and/or other types of sensors 127. Environment sensor(s) 122 may be configured to detect aspects of road geometry, road grade/slope, traffic conditions, movements and characteristics of other vehicles, and other external events and conditions.

Referring again to FIG. 1, a sensor fusion algorithm 167 may be an algorithm (or a computing device storing an algorithm) configured to accept data from the sensor system 120 as an input. The data may include, for example, data representing information sensed at the sensors of the sensor system 120. The sensor fusion algorithm 167 may include or be configured to be executed using, for instance, a Kalman filter, Bayesian network, or other algorithm. The sensor fusion algorithm 167 may provide various assessments based on the data from sensor system 120. Depending upon the embodiment, the assessments may include evaluations of individual objects and/or features in the environment of vehicle 100, evaluations of particular situations, and/or evaluations of possible impacts based on the particular situation. Other assessments are possible.

The vehicle wireless communications interface 169 may be configured to enable and/or facilitate communication between the components and systems of the vehicle and entities (such as cloud facilities, cellular and other mobile communications devices, other vehicles, remote servers, pedestrians, etc.) exterior of the vehicle. Wireless communications interface 169 may be configured to facilitate, establish, maintain, and end wireless V2V and V2X communications with any extra-vehicular entity, for example other connectibly-configured vehicles and connected vehicles, pedestrians, servers and entities located in the cloud, edge servers, and other information sources and entities. Information such as sensor data, traffic information, road condition information, weather information, and other types of information may be transmitted and received via the communications interface 169. If required, wireless communications interface 169 may incorporate or be in communication with any network interfaces needed to communicate with any extra-vehicular entities and/or networks.

The vehicle 100 can include an input system 130. An "input system" includes any device, component, system, element or arrangement or groups thereof that enable information/data to be entered into a machine. For example, the input system 130 may include a keypad, a touch screen or other interactive display, a voice-recognition system and/or any other device or system which facilitates communications between a user and the vehicle. The input system 130 can receive an input from a vehicle occupant (e.g., a driver or a passenger) or a user located remotely from the vehicle 100. In arrangements described herein, the input system 130 may be configured to enable a vehicle occupant to input control commands via a touchscreen or other mechanism. The control commands may cause desired changes in airfoil angle and/or other parameters.

The vehicle 100 can also include an output system 135. An "output system" includes any device, component, or arrangement or groups thereof that enable information/data to be presented to a vehicle occupant (e.g., a driver, a vehicle passenger, etc.) or a remote user. In one or more arrangements, the output system 135 may include a display configurable to display values of various airfoil-related parameters (such as downforce, airfoil angle(s), steering angle, steering wheel position, accelerator pedal position, brake pedal position and/or other parameters, thereby enabling a user to determine the effects of changes in values of one or more parameters (such as airfoil angle) on the values of other parameters (such as downforce) under various driving conditions.

The vehicle 100 can include one or more vehicle systems, collectively designated 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle systems 140 can include a propulsion system 141, a braking system 142, a steering system 143, throttle system 144, a suspension system 148, a transmission system 145, and/or a navigation system 147. Each of these systems can include one or more devices, components, and/or a combination thereof, now known or later developed.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110, any of the modules stored in memory 112, and/or any other vehicle components or systems. Any suitable actuator can be used. For instance, the one or more actuators 150 can include motors, pneumatic actuators, hydraulic pistons, relays, solenoids, and/or piezoelectric actuators, just to name a few possibilities. As described herein, various actuators may be configured to vary the angles of airfoils responsive to control commands from a human user of from the airfoil system control module.

Referring now to FIGS. 2A-6, any of various embodiments of an adjustable airfoil system may be incorporated into the vehicle 100 as described herein. Referring to FIGS. 2A-5, in a first arrangement, the adjustable airfoil system (generally designated 301) may include a first airfoil shaft 304 and a first airfoil 302 having a first end 302a mounted on the first airfoil shaft. The first airfoil shaft 304 may be structured to enable mounting and rotatable support of the first airfoil 302 and to enable the first airfoil 302 to be rotated by an associated rotation of the first airfoil shaft 304.

Figure 2A:
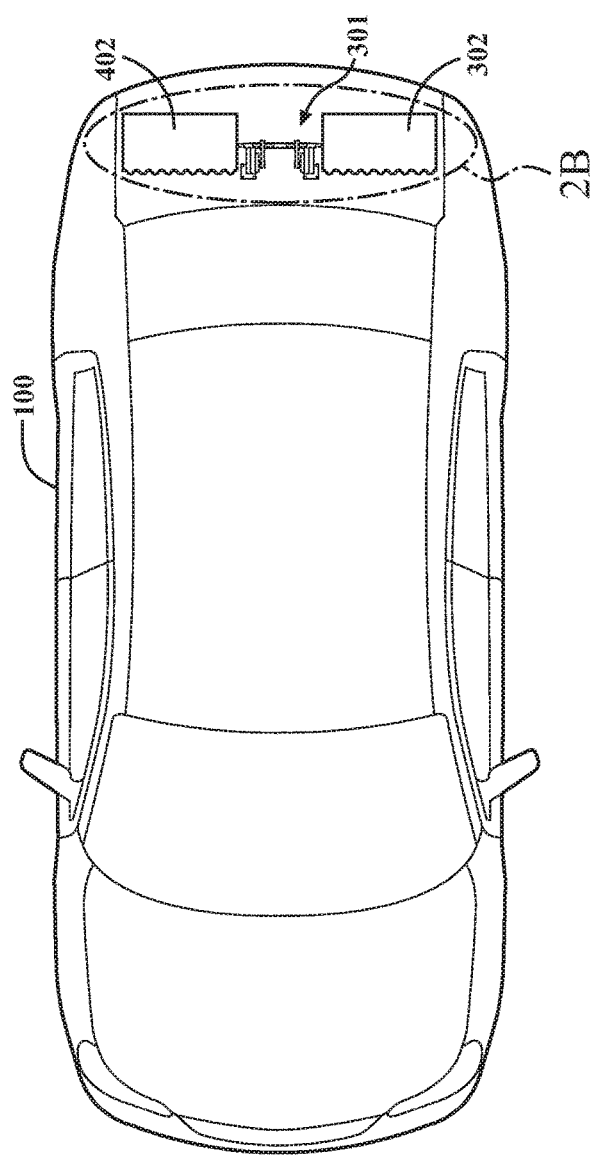
FIG. 2A is a schematic plan view of a vehicle incorporating an adjustable airfoil system in accordance with an embodiment described herein.
Figure 2B:
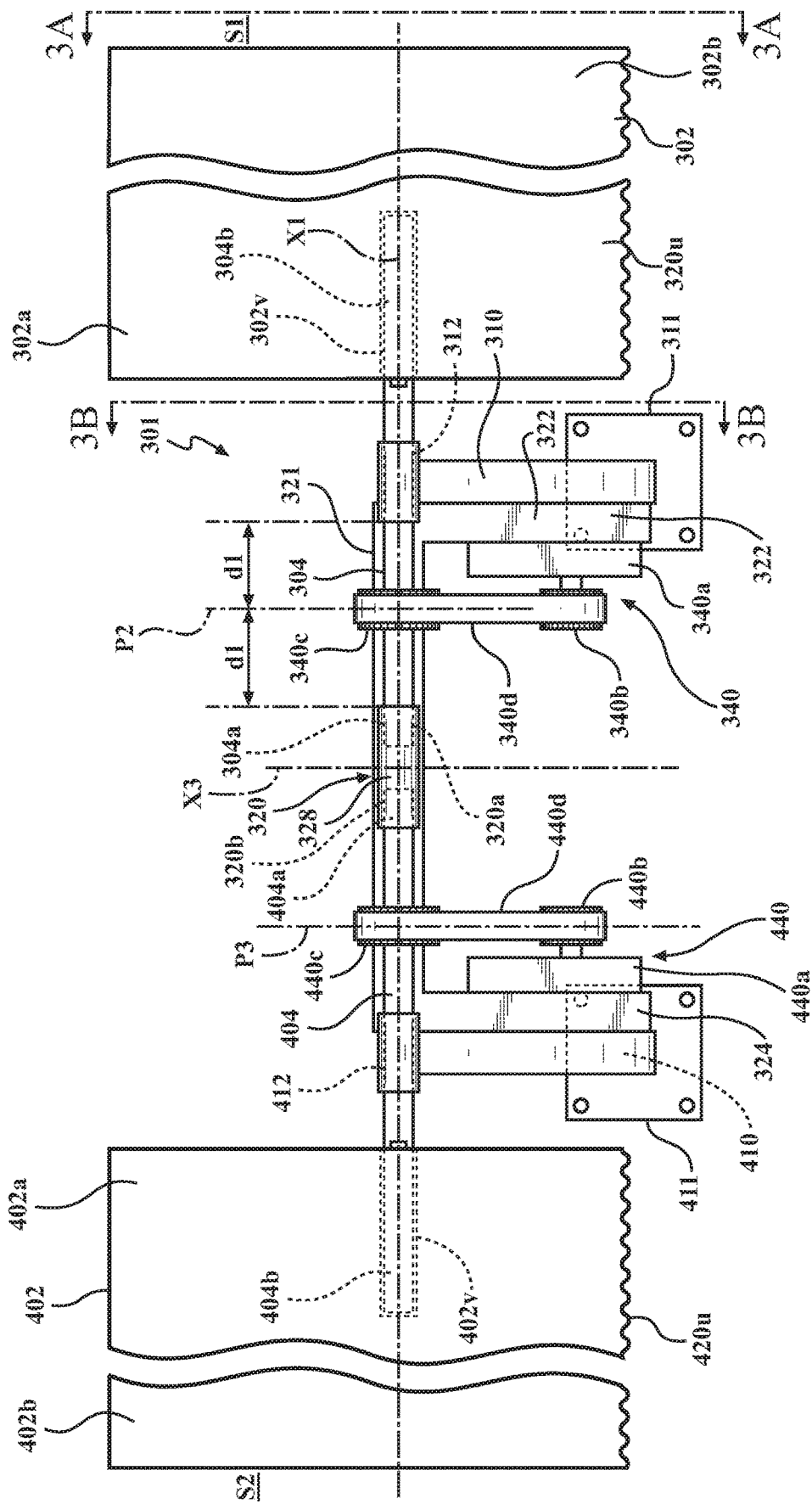
FIG. 2B is a magnified view of a portion of the adjustable airfoil system shown in FIG. 2A.

Referring to FIG. 2B, the first airfoil 302 may have the first end 302a and a second end 302b opposite the first end 302a. The first airfoil shaft 304 may include a first end 304a and a second end 304b opposite the first end 304a. The first airfoil shaft first end 304a may be supported by a shaft end support 320 as described herein. The first airfoil shaft second end 304b may reside in an interior of the first airfoil 302. The first airfoil 302 may be secured on the first airfoil shaft second end 304b by fasteners, an interference fit, overmolding, or any other suitable means. In one or more arrangements, the first airfoil shaft second end 304b may be received in a cavity 302v formed in the first airfoil. Walls of the cavity may include splines, keyways or other engagement features, and exterior surfaces of first airfoil shaft second end may have complementary splines, keys, or other engagement features formed therealong.

Figure 6:
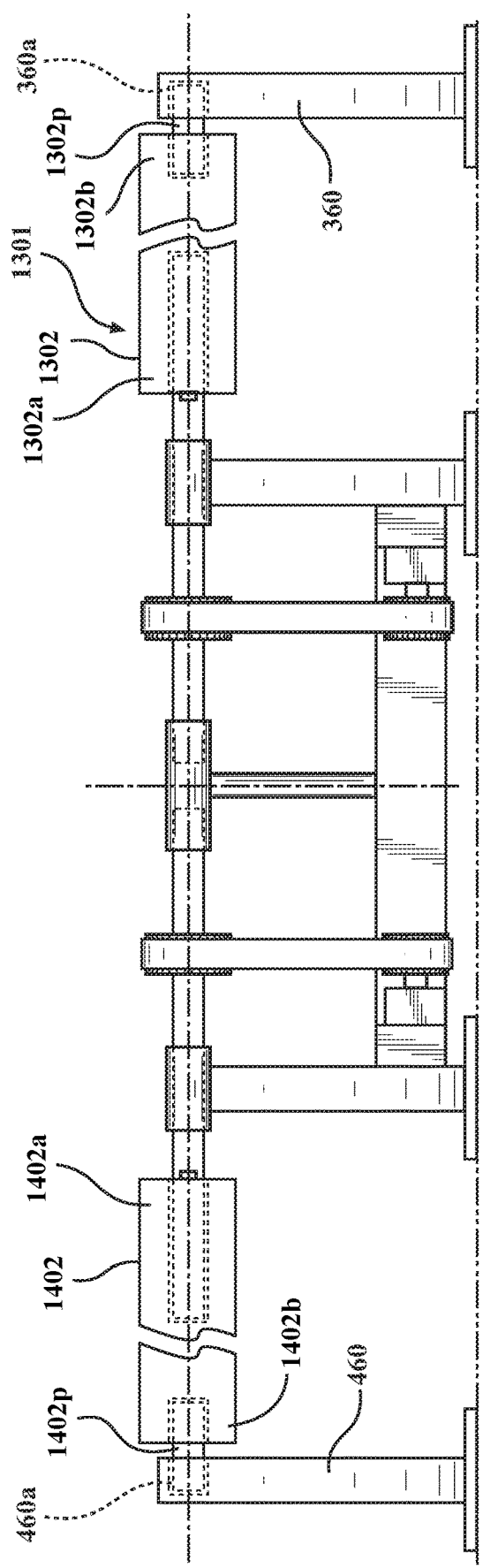
FIG. 6 is a schematic front view of an adjustable airfoil system in accordance with an alternative embodiment described herein.

In one or more arrangements, the first airfoil second end 302b and the first airfoil 302 may be unsupported by external supports (i.e., the first airfoil 302 may extend in cantilevered fashion from first airfoil support 310 toward an associated side 51 of the vehicle 100). In other embodiments, as described elsewhere herein, the first airfoil second end 302b may be supported by a side stanchion 360 as shown in FIG. 6. In some arrangements, first airfoil 302 may incorporate tubercles 320u or other structures (not shown) formed along the airfoil leading edge and configured to enhance airfoil aerodynamic characteristics.

The adjustable airfoil system 301 may also include a first airfoil support 310 structured for mounting to a portion of the vehicle 100 and for rotatably supporting a portion of the first airfoil shaft 304 at a location spaced apart from the first end 304a of the first airfoil shaft 304. The first airfoil support 310 may include a base 311 which may be mounted to a frame or body of the vehicle 100, for example, using bolts, welds, or other attachment methods. The first airfoil support 310 may include an opening 312 configured to receive a portion of the first airfoil shaft 304 therethrough and to provide rotational support to the portion of the shaft 304 residing inside the opening 312. For example, the first airfoil support 310 may incorporate suitable bearings enabling the first airfoil shaft 304 to rotate with respect to the first airfoil support 310.

The adjustable airfoil system 301 may also include a second airfoil shaft 404 and a second airfoil 402 having a first end mounted on the second airfoil shaft. The second airfoil shaft 404 may be structured to enable mounting and rotatable support of the second airfoil 402 and to enable the second airfoil 402 to be rotated by an associated rotation of the second airfoil shaft 404. The second airfoil 402 may have a first end 402a and a second end 402b opposite the first end 402a. The second airfoil shaft 404 may include a first end 404a and a second end 404b opposite the first end 404a. The second airfoil shaft first end 404a may be supported by the shaft end support 320 as described herein. The second airfoil shaft second end 404b may reside in an interior of the second airfoil 402. The second airfoil 402 may be secured on the second airfoil shaft second end 404b by fasteners, an interference fit, overmolding, or any other suitable means. In one or more arrangements, the second airfoil shaft second end 404b may be received in a cavity 402v formed in the second airfoil. Walls of the cavity may include splines, keyways or other engagement features, and exterior surfaces of second airfoil shaft second end 404b may have complementary splines, keys, or other engagement features formed therealong.

In one or more arrangements, the second airfoil second end 402b and the second airfoil 402 may be unsupported by external supports (i.e., the second airfoil 402 may extend in cantilevered fashion from a second airfoil support 410 toward an associated side S2 of the vehicle 100). In other embodiments, as described elsewhere herein, the second airfoil second end 402b may be supported by a side stanchion 460 as shown in FIG. 6. In some arrangements, second airfoil 402 may incorporate tubercles or other structures 420u located along the airfoil leading edge and configured to enhance airfoil aerodynamic characteristics.

The adjustable airfoil system 301 may also include a second airfoil support 410 structured for mounting to a portion of the vehicle 100 and for rotatably supporting a portion of the second airfoil shaft 404 at a location spaced apart from the first end 404a of the second airfoil shaft 404. The second airfoil support 410 may include a base 411 which may be mounted to a frame or body of the vehicle, for example, using bolts, welds, and/or other attachment methods. The second airfoil support 410 may include an opening 412 configured to receive a portion of the second airfoil shaft 404 therethrough and to provide rotational support to the portion of the shaft 404 residing inside the opening 412. For example, the second airfoil support 410 may incorporate suitable bearings enabling the second airfoil shaft 404 to rotate with respect to the second airfoil support 410.

FIGS. 2B and 4 show an example of a first airfoil support 310 and a second airfoil support 410 attached to vehicle 100. First airfoil support 310 and second airfoil support 410 may be attached to vehicle 100 so as to support portions of the first airfoil shaft 304 and the second airfoil shaft 404 so that they are coaxially-aligned along an axis X1 when mounted on the vehicle 100.

The adjustable airfoil system 301 may also include a shaft end support 320 rigidly coupled to the first airfoil support 310 and the second airfoil support 410. The shaft end support 320 may be structured to rotatably support the first end 304a of the first airfoil shaft 304 and the first end 404a of the second airfoil shaft 404 when the shaft end support 320 is rigidly coupled to the first airfoil support 310 and the second airfoil support 410 as described herein. The shaft end support 320 may have a pair of oppositely facing cavities 320a, 320b formed therein, each cavity being structured for receiving therein an associated first end of one of the first airfoil shaft and the second airfoil shaft. Each cavity may include suitable bearings enabling the first and second airfoil shafts 304, 404 to rotate with respect to the shaft end support 320. "Rigid coupling" and "rigid attachment" as used herein are understood to mean a direct or indirect connection between elements structured to prevent rotation and/or other relative movement of each element with respect to the other element(s).

FIGS. 2B, 3B, 4 and 5 show one embodiment of a shaft end support 320. FIG. 5 is a schematic perspective view of a shaft end support 320 in accordance with an embodiment described herein. The shaft end support 320 may have a central portion 321, a first leg 322 extending from a first end 321a of the central portion 321, and a second leg 324 extending from a second end 321b of the central portion 321 opposite the first end 321a. A column 326 may extend from a middle of the central portion 321 to support a housing 328 including the oppositely facing first and second cavities 320a, 320b structured to receive therein, respectively, the first end 304a of the first airfoil shaft 304 and the first end 404a of the second airfoil shaft 404. The cavities 320a, 320b may be structured to rotatably support the first end 304a of the first airfoil shaft 304 and the first end 404a of the second airfoil shaft 404 therein, by use of suitable bearings or other means. The airfoil shaft first ends 304a, 404a, may be structured to form interference fits with the bearings to secure the airfoil shafts 304, 404 to the shaft end support 320. The plane X3 shown in FIG. 4 may be a central plane of the adjustable airfoil system.

As seen in FIGS. 2B, 3B, 4 and 5, shaft end support first leg 322 may be structured to be rigidly attached to the first airfoil shaft support 310, and shaft end support second leg 324 may be structured to be rigidly attached to the second airfoil shaft support 410 when the first and second airfoil shaft supports 310, 410 are rigidly attached to portions of the vehicle 100. First and second legs 322, 324 may be rigidly attached to the airfoil shaft supports 310, 410 using bolts, welds, or any other suitable method. In addition, all the portions of the shaft end support 320 may be rigidly connected to each other using any suitable means. Thus, the airfoil shaft supports 310, 410 rigidly attached to portions of the vehicle 100 and the rigidly constructed shaft end support 320 (which is rigidly attached to the airfoil shaft supports 310, 410) combine to provide a rigid structure supporting and aligning the first and second airfoil shafts 304, 404.

Referring to FIGS. 2B, 3B, and 4, the adjustable airfoil system 301 may include a first airfoil rotation mechanism 340 structured to be rigidly coupled to the first airfoil support 310. The first airfoil rotation mechanism 340 may be operable to exert a rotation force on the first airfoil shaft 304 at a location between the first airfoil support 310 and the shaft end support 320, thereby causing the first airfoil shaft 304 to rotate responsive to control signals. This enables control of the airfoil angle of the first airfoil 302.

In one or more arrangements, the first airfoil rotation mechanism 340 includes a first motor 340a, a first drive gear 340b coupled to the first motor 340a so as to be rotatable by the first motor, and a first shaft gear 340c mounted on the first airfoil shaft 304 between the first airfoil support 310 and the shaft end support 320. The first motor 340a may be rigidly coupled to the first leg 322 of the shaft end support 320. In one or more arrangements, the first motor 340a is directly attached to the shaft end support first leg 322.

In particular arrangements, a central plane P2 of the first shaft gear 340c may be centered between (i.e., spaced equal distances dl from) the shaft end support 320 and the first airfoil support 310 as shown in FIG. 2B. A first drive belt 340d may extend between the first drive gear 340b and the first shaft gear 340c and may be structured to transfer rotational motion from the rotating first drive gear 340b to the first shaft gear 340c to rotate the first airfoil shaft 304. In some arrangements, the first drive belt 340d may be a toothed drive belt. Alternatively, the first airfoil rotation mechanism 340 may have any of a variety of other structures (for example, a chain drive) suitable for causing rotation of the first airfoil shaft 304 responsive to control commands.

Referring to FIGS. 2B, 3B, and 4, the adjustable airfoil system may also include a second airfoil rotation mechanism 440 structured to be rigidly coupled to the second airfoil support 410. The second airfoil rotation mechanism 440 may be operable to exert a rotation force on the second airfoil shaft 404 at a location between the second airfoil support 410 and the shaft end support 320, thereby causing the second airfoil shaft 404 to rotate responsive to control signals. This enables control of the airfoil angle of the second airfoil 402.

In one or more arrangements, the second airfoil rotation mechanism 440 includes a second motor 440a, a second drive gear 440b coupled to the second motor 440a so as to be rotatable by the second motor 440a, and a second shaft gear 440c mounted on the second airfoil shaft 404 between the second airfoil support 410 and the shaft end support 320. The second motor 440a may be rigidly coupled to the second leg 324 of the shaft end support 320. In one or more arrangements, the second motor 440a is directly attached to the shaft end support second leg 324.

In particular arrangements, a central plane P3 of the second shaft gear 440c may be centered between the shaft end support 320 and the second airfoil support 410, in the same manner as described for plane P2. A second drive belt 440d may extend between the second drive gear 440b and the second shaft gear 440c and may be structured to transfer rotational motion from the rotating second drive gear 440b to the second shaft gear 440c to rotate the second airfoil shaft 404. In some arrangements, the second drive belt 440d may be a toothed drive belt. Alternatively, the second airfoil rotation mechanism 440 may have any of a variety of other structures (for example, a chain drive) suitable for causing rotation of the second airfoil shaft 404 responsive to control commands.

Motors 340a, 440a of the adjustable airfoil system 301 may be powered by wires/cables electrically coupling the motors to the vehicle engine and/or a vehicle battery, depending on the vehicle configuration, driving conditions, and other factors. A shroud or cover (not shown) may be provided for covering the elements of the adjustable airfoil system residing between the airfoils 302 and 402. The shroud may be streamlined for aerodynamic properties and may be sealable to prevent moisture, dirt, dust, etc. from reaching elements of the adjustable airfoil system.

In accordance with a first alternative embodiment, airfoils 302 and 402 may be structured to be detachable from the first airfoil shaft 304 and the second airfoil shaft 404. Thus, airfoils 302 and 402 may be detachable from the vehicle 100 for replacement with other airfoils having either the same or different configurations. For example, the adjustable airfoil system may be in the form of a kit usable for add-on or vehicle retrofit purposes, with different versions of the kit including airfoils having different lengths, different total surface areas, different designs of tubercles and leading edge configurations, and/or other characteristics. This may enable the adjustable airfoil system to be applied to different sizes and styles of vehicles having different widths. This may also generally aid in mounting of the adjustable airfoil system to the vehicle. In another scenario, detachability of the airfoils from the airfoil shafts also aids in repair and/or replacement of damaged airfoils and enables airfoils having differing characteristics to be sampled on a given vehicle to determine an optimum airfoil configuration for the vehicle. The first and second airfoils 302, 402 may be detachably secured to respective shaft second ends 304b, 404b using any suitable method, for example, a spring pin or a set screw.

Referring again to FIG. 4, in particular embodiments of the adjustable airfoil system including detachable airfoils, each airfoil may be associated with airfoil structural and operational information which may aid the airfoil system control module 124 in performing the control functions described herein. The airfoil structural and operational information may be stored on a storage medium which is attached to the airfoil and which is configured to enable access to the information (either directly or indirectly) by the airfoil system control module 124. In one example, airfoil structural and operational information may be incorporated into radio frequency ID (RFID) tags 302t, 402t attached to each airfoil. A tag reading mechanism may be incorporated into the vehicle 100 in communication with the airfoil system control module 124 for accessing the tag information.

The airfoil system control module 124 may include computer-readable instructions that when executed by the processors cause the processors to cause generation of one or more signals querying the RFID tag 302t for the airfoil structural and operational information pertaining to the airfoil, either when the airfoil is installed on the vehicle 100 or at a later time. Any type of information may be included in the RFID tag, for example, surface area of upper and lower airfoil surfaces, leading edge aerodynamic information as acquired during testing of the airfoil, drag coefficients and other drag-related information, and any other information which may be useful to optimization and performance of the control functions described herein. For example, the airfoil system control module 124 may be configured to, using the structural and operational information pertaining to the airfoil, predict values of parameters such as downforce or drag for a given vehicle speed and airfoil angle. This capability may be useful in familiarizing a vehicle occupant with the capabilities of the airfoil system under various conditions. This capability may also be useful in predicting vehicle operating conditions (for example, excessive drag) which may prompt a warning to a vehicle occupant to forego implementing a requested airfoil angle. For example, the airfoil system control module may be configured to generate an alert if a user attempts to control the airfoil angle to change the angle to a value (i.e., a "proposed" airfoil angle) which will produce an airfoil drag exceeds a predetermined threshold, for a given current speed of the vehicle. In another aspect, the airfoil system control module may be configured to generate an alert if a user adjusts the vehicle speed to a speed at which the drag produced by the airfoil at the existing airfoil angle exceeds a predetermined threshold.

Referring to FIG. 3C, to align a replacement airfoil with a horizontal plane for purposes of airfoil angle determination after mounting the airfoil onto an airfoil shaft, the airfoil system control module 124 may include computer-readable instructions that when executed by the processor(s) 110 cause the processors to control operation of an associated airfoil rotation mechanism motor to rotate the airfoil shaft to an orientation associated with a predetermined rotational position or orientation of the associated drive gear. This predetermined rotational position or orientation of a drive gear may be associated with a predetermined rotational position or orientation of the driven or shaft gear, which in turn may define a particular rotational position of a key or keyway on the second end of the airfoil shaft which is inserted into the cavity in the airfoil. This key or keyway may be structured to engage a complementary feature in the airfoil cavity, to align the airfoil with respect to the reference plane R1. In this manner, a new airfoil may be oriented with respect to the reference plane R1 for purposes of determining the airfoil angle during vehicle operation. Other alignment and/or orientation methods may also be used.

FIG. 6 is a schematic front view of an adjustable airfoil system 1301 in accordance with a second alternative embodiment 1301 disclosed herein. The embodiment shown in FIG. 6 is similar to that shown in FIGS. 2 and 4 and includes the same or similar elements except for the further inclusion of the side stanchions 360, 460 described herein. Side stanchions 360, 460 may be provided and attached to the vehicle body at a suitable location needed to accommodate the length of a given airfoil. In certain arrangements, the adjustable airfoil system 1301 may include a first side stanchion 360 structured to be mountable to a portion of the vehicle and to rotatably support the second end 1302b of a first airfoil 1302 when the first side stanchion 360 is mounted to a portion of the vehicle 100. In addition, a second side stanchion 460 may be structured to be mountable to a portion of the vehicle 100 to rotatably support the second end 1402b of a second airfoil 1402 when the second side stanchion 460 is mounted to the portion of the vehicle 100. In one or more arrangements, first and second airfoils 1302, 1402 may include respective mounting projections

1302*p*, 1402*p* extending from respective airfoil first and second ends 1302*b*, 1402*b*. Each of side stanchions 360, 460 may have a respective cavity 360*a*, 460*a* formed therein and structured for receiving and rotatably supporting therein a respective one of mounting projections 1302*p*, 1402*p*. The cavities 360*a*, 460*a* may incorporate suitable bearings or other mechanisms if needed to rotatably support the mounting projections. The side stanchions 360, 460 may provide additional support to airfoils 1302, 1402 having lengths above a certain threshold value, to aid in maintaining airfoil rigidity and the desired airfoil angle during high speed vehicle operation.

The vehicle 100 can include one or more modules, at least some of which are described herein. In embodiments described herein, a memory 112 may store an autonomous driving module 160 and an airfoil system control module 124. The memory 112 is a random-access memory (RAM), read-only memory (ROM), a hard-disk drive, a flash memory, or other suitable memory for storing the modules 160 and 124. The modules 160 and 124 are, for example, computer-readable instructions that when executed by the processor 110, cause the processor(s) 110 to perform the various functions disclosed herein. Additional modules (not shown) may also be stored in memory 112.

The modules can be implemented as computer-readable program code that, when executed by processor(s) 110, implement one or more of the various processes described herein. One or more of the modules can be a component of the processor(s) 110, or one or more of the modules can be executed on and/or distributed among other processing systems to which the processor(s) 110 is operably connected. The modules can include instructions (e.g., program logic) executable by one or more processor(s) 110. Alternatively, or in addition, one or more of data store(s) 115 or another portion of the vehicle 100 may contain such instructions.

Generally, a module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc. The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to geographical map data.

The autonomous driving module(s) 160 can be configured to determine travel path(s), current autonomous driving maneuvers for the vehicle 100, future autonomous driving maneuvers and/or modifications to current autonomous driving maneuvers based on data acquired by the sensor system 120 and/or information received from a navigation system, such as navigation system 147. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured to implement determined driving maneuvers. The autonomous driving module(s) 160 can cause, directly or indirectly, such autonomous driving maneuvers to be implemented. As used herein, "cause" or "causing" means to make, force, compel, direct, command, instruct, and/or enable an event or action to occur or at least be in a state where such event or action may occur, either in a direct or indirect manner.

The autonomous driving module(s) 160 can be configured to execute various vehicle functions and/or to transmit data to, receive data from, interact with, and/or control the vehicle 100 or one or more systems thereof (e.g., one or more of vehicle systems 140). The autonomous driving module(s) 160 may be configured to autonomously control the vehicle 100 so as to drive the vehicle along a travel route, from an initial or start location to a destination.

The processor(s) 110, the autonomous driving module 160 and the airfoil system control module 124 can be operably connected to communicate with each other and with the other elements of the vehicle, including various vehicle systems 140 and/or individual components thereof. For example, referring to FIG. 1, the processor(s) 110, the airfoil system control module 124, and the autonomous driving module(s) 160 can be in communication to send and/or receive information from the various vehicle systems 140 to control the vehicle movement, speed, maneuvering, heading, direction, and the angles of the airfoils described herein. The processor(s) and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). The processor(s) 110, the autonomous driving module(s) 160, the airfoil control module 124 and/or other elements of the vehicle 100 may control some or all of the vehicle systems 140 and, thus, may be partially or fully autonomous.

The airfoil system control module 124 may include computer-readable instructions that when executed by the processor(s) 110 cause the processor(s) to automatically control operation of the first airfoil rotation mechanism 340 so as to control the angle of the first airfoil 302 responsive to data from one or more sensors mounted to the vehicle 100. The airfoil system control module 124 may also include computer-readable instructions that when executed by the processor(s) cause the processor(s) 110 to autonomously control operation of the second airfoil rotation mechanism 440 so as to control an angle of the second airfoil 402 independently of the angle of the first airfoil, responsive to data from one or more sensors mounted to the vehicle. In one or more arrangements, the first airfoil 302 and the second airfoil 402 may be controlled independently/separately and also simultaneously by the airfoil system control module 124. The first and second airfoils may be adjusted to airfoil angles having different values or equal values.

For example, when the vehicle 100 is determined to be turning right, and responsive to values of vehicle operational parameters such as steering wheel angle, accelerator and/or brake position, and vehicle speed as determined or estimated by vehicle sensors, the airfoil system control module 124 may autonomously cause generation of a control command which controls operation of the second airfoil rotation mechanism 440 to change the angle of the second (i.e., right side) airfoil 402 so as to tilt a leading edge of the airfoil downwardly as shown in FIG. 3C, thereby increasing the downforce acting on the right side of the vehicle 100. This may aid in preventing a tendency of the vehicle to roll over in a direction opposite the direction of turning, especially in tight turns and in high-speed turns. The speed of the change in airfoil angle and/or the degree of airfoil angle change may be proportional to the vehicle speed when turning, the steering wheel angle, and the values of other parameters.

In another example, responsive to brake pedal position, vehicle speed, and the steering wheel angle being determined to be at or near 0° (i.e., with the vehicle wheels pointed at or near straight ahead), the airfoil system control module 124 may autonomously cause generation of a control command which changes the angle of the both of airfoils 302, 402 as shown in FIG. 3C so as to increase the downforce acting on both sides of the vehicle, thereby augmenting the braking force.

In one or more arrangements, the airfoil system control module 124 also includes computer-readable instructions that when executed by the processor(s) 110 cause the processor(s) to control operation of the first airfoil rotation mechanism 340 so as to control, individually and independently, an angle of the first airfoil 302 and/or an angle of the second airfoil 402 responsive to manual control commands from a vehicle occupant. The occupant may input control commands using the input system 130.

For example, a vehicle occupant may manually input a command for the angles of both airfoils 302, 402 to be changed so as to increase downforce acting on both sides of the vehicle 100 during a braking maneuver in a case where the occupant suspects that road conditions are more slippery than normal.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module, as envisioned by the present disclosure, is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. An adjustable airfoil system for a vehicle, the system comprising:
    a first airfoil shaft;
    a first airfoil having a first end mounted on the first airfoil shaft
    a first airfoil support structured for mounting to a portion of a vehicle and for rotatably supporting a portion of the first airfoil shaft at a location spaced apart from a first end of the first airfoil shaft;
    a second airfoil shaft;
    a second airfoil having a first end mounted on the second airfoil shaft;
    a second airfoil support structured for mounting to a portion of a vehicle and for rotatably supporting a portion of the second airfoil shaft spaced apart from a first end of the second airfoil shaft; and
    a shaft end support rigidly coupled to the first airfoil support and the second airfoil support, the shaft end support also being structured to rotatably support the first end of the first airfoil shaft and the first end of the second airfoil shaft when the shaft end support is rigidly coupled to the first airfoil support and the second airfoil support.

2. The airfoil system of claim 1 further comprising a first airfoil rotation mechanism structured to be rigidly coupled to the first airfoil support and operable to exert a rotation force on the first airfoil shaft at a location between the first airfoil support and the shaft end support.

3. The airfoil system of claim 2 wherein the first airfoil rotation mechanism comprises:

a first motor;
a first drive gear coupled to the first motor so as to be rotatable by the first motor;
a first shaft gear mounted on the first airfoil shaft; and
a first drive belt extending between the first drive gear and the first shaft gear and structured to transfer rotational motion from the first drive gear to the first shaft gear to rotate the first airfoil shaft to control an angle of the first airfoil.

4. The airfoil system of claim 2 further comprising a second airfoil rotation mechanism structured to be rigidly coupled to the second airfoil support and to exert a rotation force on the second airfoil shaft.

5. The airfoil system of claim 4 wherein the second airfoil rotation mechanism comprises:
    a second motor;
    a second drive gear coupled to the second motor so as to be rotatable by the second motor;
    a second shaft gear mounted on the second airfoil shaft; and
    and a second drive belt extending between the second drive gear and the second shaft gear and structured to transfer rotational motion from the second drive gear to the second shaft gear to rotate the second airfoil shaft to control an angle of the second airfoil.

6. The airfoil system of claim 5 further comprising one or more processors and a memory communicably coupled to the one or more processors and storing an airfoil system control module including computer-readable instructions that when executed by the one or more processors cause the one or more processors to:
    autonomously control operation of the first airfoil rotation mechanism so as to control the angle of the first airfoil responsive to data from one or more sensors mounted to the vehicle; and
    autonomously control operation of the second airfoil rotation mechanism so as to control the angle of the second airfoil independently of the angle of the first airfoil, responsive to data from one or more sensors mounted to the vehicle.

7. The airfoil system of claim 6 wherein the airfoil system control module includes computer-readable instructions that when executed by the one or more processors cause the one or more processors to:
    autonomously control operation of the first airfoil rotation mechanism so as to adjust the angle of the first airfoil to a first value; and
    autonomously control operation of the second airfoil rotation mechanism so as to adjust the angle of the second airfoil to the first value.

8. The airfoil system of claim 6 wherein the airfoil system control module includes computer-readable instructions that when executed by the one or more processors cause the one or more processors to:
    control operation of the first airfoil rotation mechanism so as to control the angle of the first airfoil responsive to control commands from a vehicle occupant; and
    control operation of the second airfoil rotation mechanism so as to control the angle of the second airfoil independently of the angle of the first airfoil, responsive to control commands from a vehicle occupant.

9. The airfoil system of claim 8 wherein the airfoil system control module includes computer-readable instructions that when executed by the one or more processors cause the one or more processors to:

responsive to control commands from a vehicle occupant, control operation of the first airfoil rotation mechanism so as to adjust the angle of the first airfoil to a first value; and responsive to control commands from a vehicle occupant, control operation of the second airfoil rotation mechanism so as to adjust the angle of the second airfoil to the first value.

10. The airfoil system of claim 1 wherein the shaft end support includes:
- a central portion;
- a first leg extending from a first side of the central portion, the first leg being structured to be rigidly connected to the first airfoil support;
- a second leg extending from a second side of the central portion opposite the first side, the second leg being structured to be rigidly connected to the second airfoil support;
- a column extending from the central portion between the first and second legs; and
- a housing supported by the column, the housing including a first cavity structured to receive and rotatably support therein the first end of the first airfoil shaft, and a second cavity structured to receive and rotatably support therein the first end of the second airfoil shaft.

11. The airfoil system of claim 1 further comprising a first side stanchion structured to be mountable to a portion of the vehicle and to rotatably support a second end of the first airfoil opposite the first end of the first airfoil when the first side stanchion is mounted to portion of the vehicle, and a second side stanchion structured to be mountable to a portion of the vehicle and to rotatably support a second end of the second airfoil opposite the first end of the second airfoil when the second side stanchion is mounted to portion of the vehicle.

12. The airfoil system of claim 1 wherein the first airfoil is structured to be detachable from the first airfoil shaft, and wherein the second airfoil is structured to be detachable from the second airfoil shaft.

13. The airfoil system of claim 12 wherein at least one of the first airfoil and the second airfoil has a RFID tag attached thereto, and wherein the RFID tag is configured to store structural and operational information pertaining to the at least one of the first airfoil and the second airfoil.

14. The airfoil system of claim 13 further comprising one or more processors and a memory communicably coupled to the one or more processors and storing an airfoil system control module including computer-readable instructions that when executed by the one or more processors cause the one or more processors to:
- cause generation of one or more signals querying the RFID tag for information residing thereon;
- using information residing on or extracted from the RFID tag, determine an estimated value of a drag of the at least one of the first airfoil and the second airfoil at a proposed airfoil angle and at a current speed of the vehicle; and
- cause an alert signal to be generated if the estimated value of the drag exceeds a predetermined threshold.

15. The airfoil system of claim 13 further comprising one or more processors and a memory communicably coupled to the one or more processors and storing an airfoil system control module including computer-readable instructions that when executed by the one or more processors cause the one or more processors to:
- cause generation of one or more signals querying the RFID tag for information residing thereon;
- using information residing on or extracted from the RFID tag, determine an estimated value of a drag of the at least one of the first airfoil and the second airfoil at a current airfoil angle and speed of the vehicle; and
- cause an alert signal to be generated if the estimated value of the drag exceeds a predetermined threshold.

16. The airfoil system of claim 1 wherein a leading edge of at least one of the first airfoil and the second airfoil has a plurality of tubercles formed along a leading edge thereof.

* * * * *